(12) United States Patent
Titterington

(10) Patent No.: US 8,528,930 B2
(45) Date of Patent: Sep. 10, 2013

(54) TOOL-LESS MANUAL QUICK RELEASE SNOWBOARD-MOUNTED INTERFACE BINDING SYSTEM VIA A SNOWBOARD BINDING

(76) Inventor: Dennis Titterington, Sacramento, CA (US)

( * ) Notice: Subject to any disclaimer, the term of this patent is extended or adjusted under 35 U.S.C. 154(b) by 298 days.

(21) Appl. No.: 12/868,585

(22) Filed: Aug. 25, 2010

(65) Prior Publication Data

US 2011/0057418 A1    Mar. 10, 2011

Related U.S. Application Data

(60) Provisional application No. 61/276,125, filed on Sep. 8, 2009, provisional application No. 61/336,280, filed on Jan. 20, 2010.

(51) Int. Cl.
*A63C 9/00* (2012.01)

(52) U.S. Cl.
USPC ............ 280/623; 280/624; 280/632; 280/637

(58) Field of Classification Search
USPC ............ 280/809, 823, 816, 637, 619, 87.042; 224/585, 401
See application file for complete search history.

(56) References Cited

U.S. PATENT DOCUMENTS

| | | | |
|---|---|---|---|
| 4,685,697 A * | 8/1987 | Thorley | 280/637 |
| 4,837,494 A * | 6/1989 | Maier | 280/809 |
| 4,955,835 A | 9/1990 | Hollingsworth | |
| 5,096,103 A * | 3/1992 | Baugh | 224/585 |
| 5,857,682 A | 1/1999 | Hyman | |
| D423,618 S | 4/2000 | Kincaid et al. | |
| 6,352,459 B1 * | 3/2002 | Hodge et al. | 280/809 |
| 6,422,048 B1 * | 7/2002 | Fontes et al. | 280/809 |
| 7,484,765 B2 * | 2/2009 | Harper | 280/809 |
| 7,559,579 B2 * | 7/2009 | Furlani | 280/809 |
| 7,571,924 B2 | 8/2009 | White | |
| 7,658,413 B2 * | 2/2010 | Malone | 280/823 |
| 2004/0251287 A1 | 12/2004 | Myers | |
| 2005/0173917 A1 | 8/2005 | Kovall et al. | |
| 2007/0110278 A1 | 5/2007 | Vock et al. | |
| 2008/0116664 A1 | 5/2008 | Warburton et al. | |
| 2009/0152835 A1 | 6/2009 | Cunningham et al. | |

OTHER PUBLICATIONS

International Search Report mailed Nov. 4, 2010 in corresponding International Patent Application No. PCT/US10/48022 filed Sep. 7, 2010 entitled Tool-Less Manual Quick Release Snowboard-Mounted Interface Binding System via a Snowboard Binding, 7 pages.

* cited by examiner

*Primary Examiner* — Hau Phan
(74) *Attorney, Agent, or Firm* — Lewis and Roca LLP

(57) ABSTRACT

A convenience-type tool-less manual quick release binding system is provided for directly mounting accessories and equipment, such as a video kit, thermos, storage container, first aid kit, portable radio or audio device, or other accessory, onto a snowboard via the snowboard binding. When binded, the accessory is secure from unwanted release caused by rigorous use but detachable with ease when desired providing fast on and off action. In one embodiment, ladder straps are attached to the snowboard binding, and the accessories attached to the ladder straps.

12 Claims, 4 Drawing Sheets

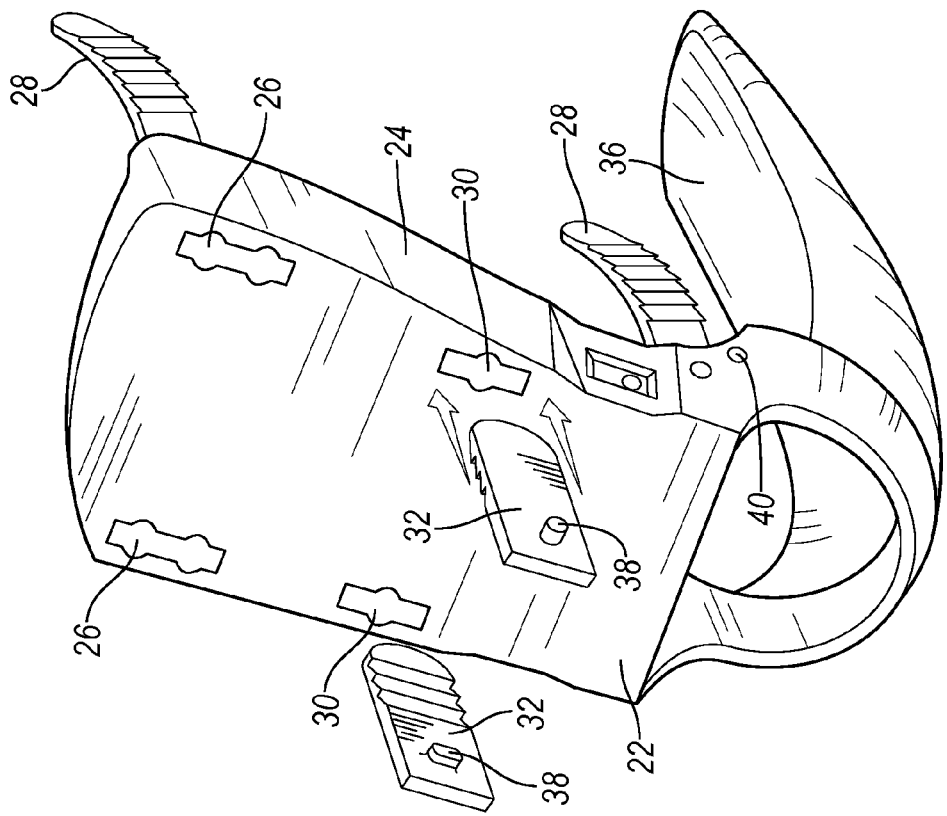
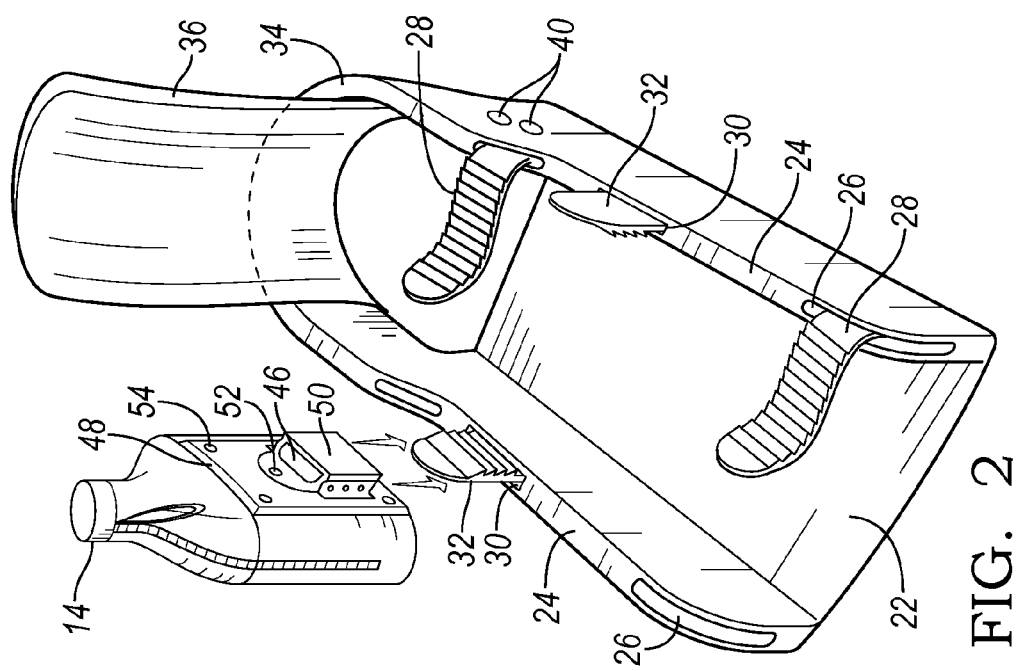

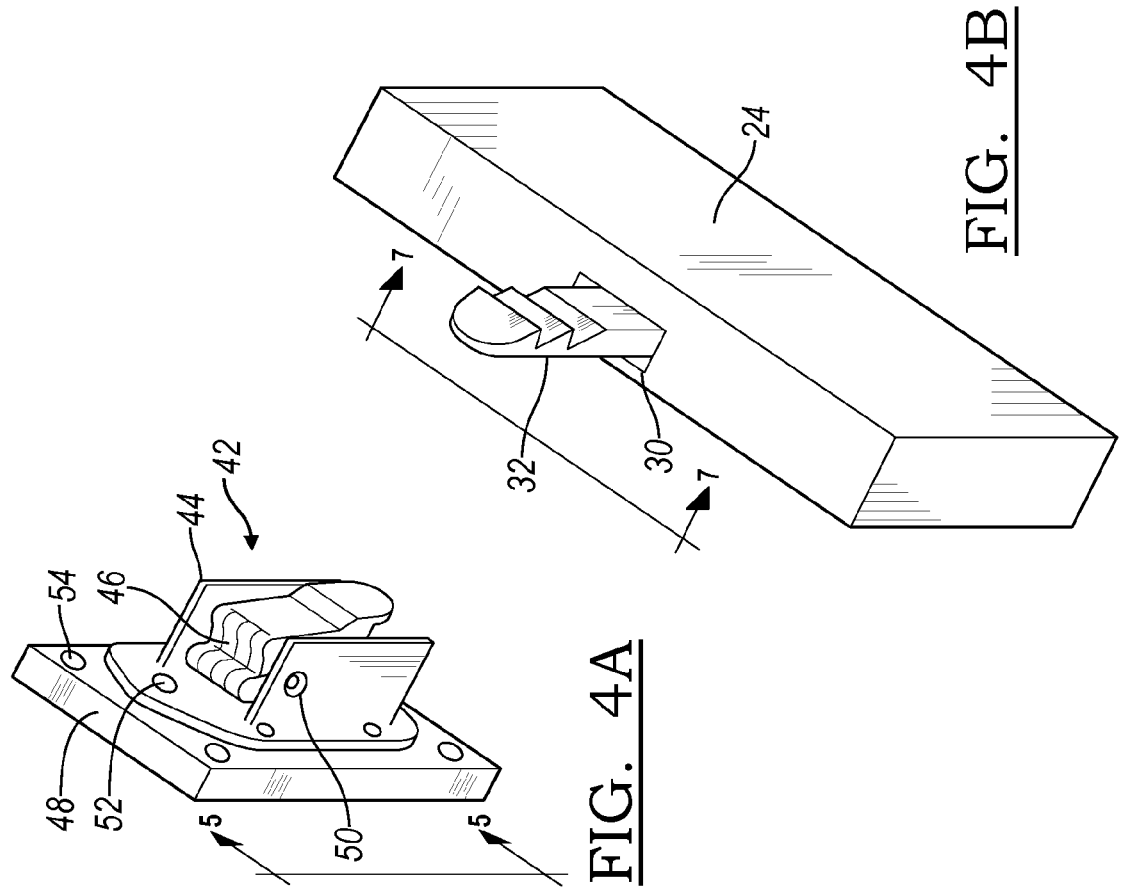
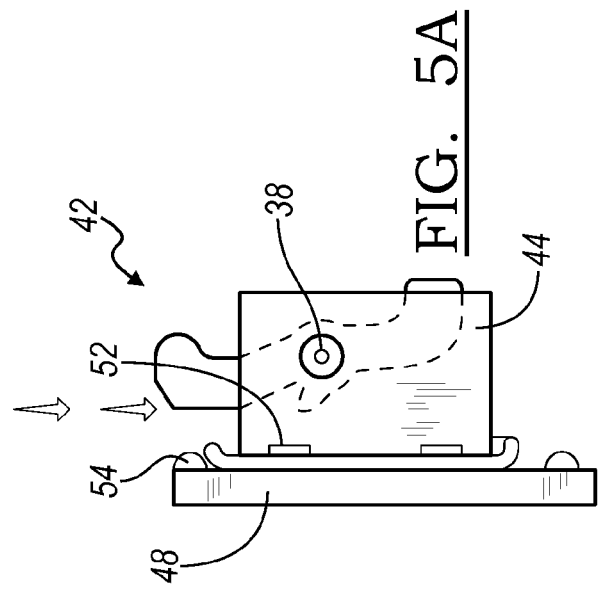
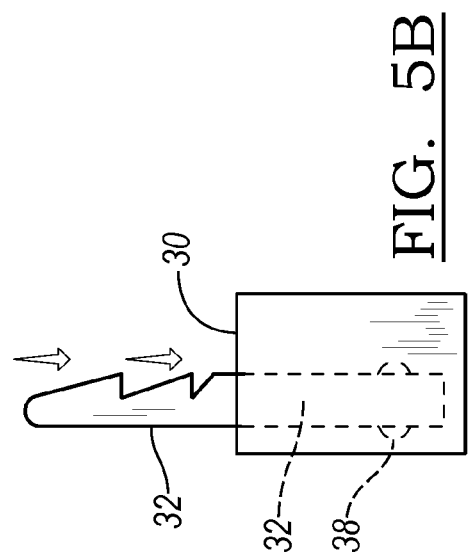

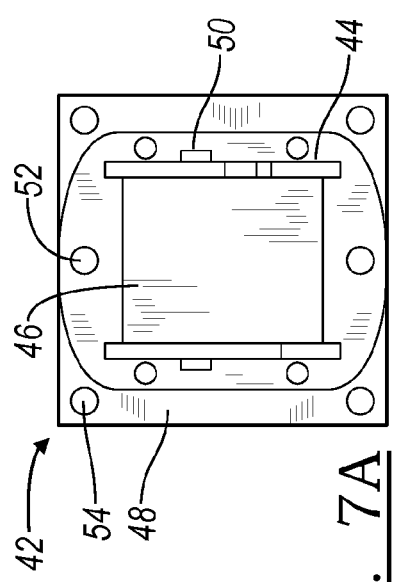
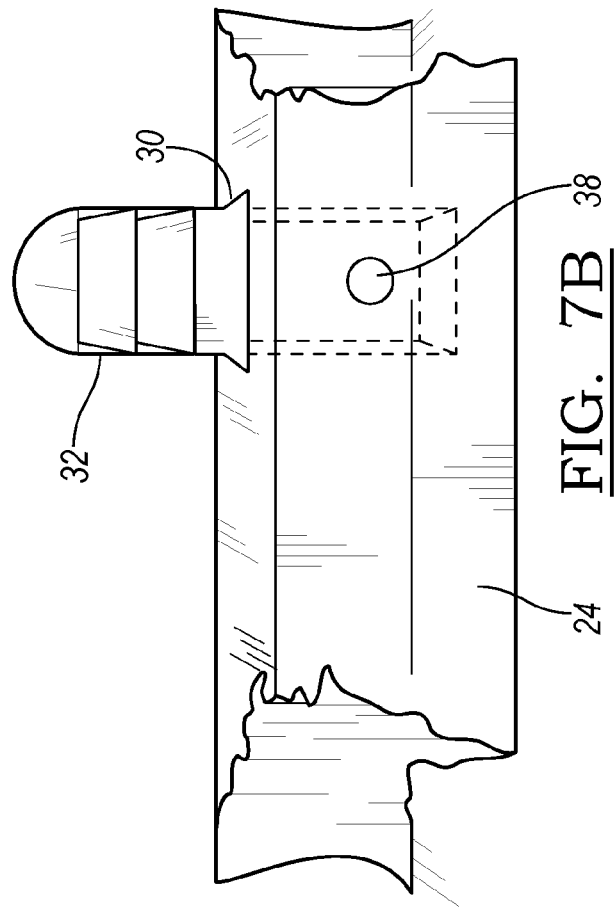
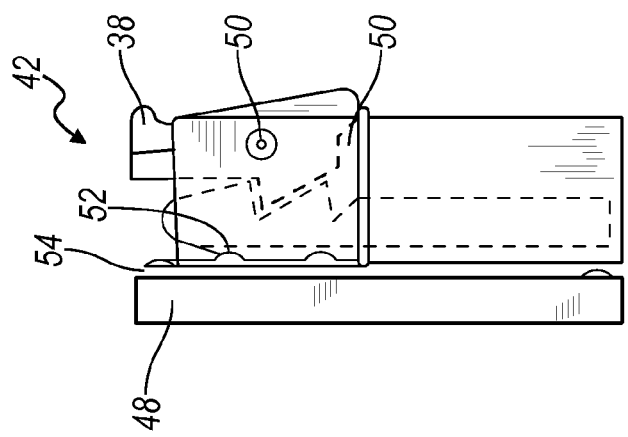

TOOL-LESS MANUAL QUICK RELEASE SNOWBOARD-MOUNTED INTERFACE BINDING SYSTEM VIA A SNOWBOARD BINDING

CROSS-REFERENCE TO RELATED APPLICATIONS

This application claims priority to U.S. Provisional Patent Applications Ser. Nos. 61/276,125, filed Sep. 8, 2009, and 61/336,280, filed Jan. 20, 2010, the entirety of which are incorporated by reference herein.

BACKGROUND OF THE INVENTION

1. Field of the Invention

The present invention relates to the field of snowboard bindings and more specifically to a convenience-type tool-less manual quick release binding system in general for securing items such as a video kit, storage container or other accessory which can be directly mounted onto a snowboard or similar sports board via the binding.

2. The Prior Art

Snowboarding was developed in the 1960s and 1970s and has become a popular world wide winter sport. One major difference between snowboarding and skiing is the use of a single board having two spaced apart bindings for a person's feet instead of two separate skis each with a binding for an individual foot.

Often times when snowboarding, backpacks, camel packs or fanny packs are used to store personal items whereas in many cases it is impractical to safely keep such objects on the person while participating in the sport. This is especially true when utilizing chair lifts to access slopes. Not only would it be advantageous to be able to carry personal items when snow boarding, it would also be advantageous to be able to carry emergency equipment.

Recently, video technology has been prolific in social forums such as You Tube, Face Book and My Space. Capturing, sharing and archiving one's life in this manner has become a voyeuristic pastime. Snowboarding is no different. It would be advantageous to be able to easily and rapidly provide this functionality.

While fatigue is a concern, the above mentioned methods for carrying personal items with added weight can cause a shift in the user's center of gravity resulting in an unnecessary fall. Even a moderate fall can be damaging to the personal items or injurious to the user as these items are in physical contact to the body such as a fanny pack against the user's spine or abdomen. Additionally, body packs not properly secured to the rider can eject forcefully away from them during impact with the ground.

Notwithstanding falling, ingress and egress onto a chairlift with a backpack or camel pack compels a user to sit more forwardly on the seat than is safe and would necessitate adjustment of the backpack or camel pack each and every time a rider uses a chairlift. Additionally, larger backpacks might necessitate placing the pack on one's lap which may fall off of the chairlift creating danger to passersby below. The present invention solves these problems by placing the pack securely on the top surface of the snowboard and beneath a rider's center of gravity thereby unaffecting performance.

Although a ski/snowboard pack patent has been addressed in U.S. Pat. No. D423,618 for ornamental purposes, a snowboard-mounted container or pack has been addressed in United States Patent Publication No. US 2004/0251287 A1 for mounting a storage container for tools and accessories onto a snowboard, U.S. Pat. No. 5,857,682 which shows a small storage compartment mounted on a snowboard for the principally expressed purpose of theft prevention, U.S. Pat. No. 5,096,103 which is a storage pack removable from the snowboard in the form of a waist pack, U.S. Pat. No. 7,658,413 which attaches a retractable snow pole to a snowboard binding, none of these prior art patents, or the prior art in general has provided a tool-less manual quick release binding system for a container, device or accessory onto a snowboard via the snowboard binding which is secure under rigorous use but detachable with ease when desired. It should also be noted that the above referenced patents are with respect to containers and snow poles attached to a snowboard and does not refer to the general and crowded field of snow board bindings.

While the field of prior art regarding snowboard bindings principally teaches the securing of a boot to a snowboard via the snowboard binding, it must be stressed that none of these prior art patents teach the securing of attachable accessories to the snowboard via the snowboard binding illustrating the new and novel basis of the present invention.

BRIEF SUMMARY OF THE INVENTION

A convenience-type tool-less manual quick release binding system is provided for directly mounting accessories and equipment, such as a video kit, thermos, storage container, first aid kit, portable radio or audio device, or other accessory, onto a snowboard via the snowboard binding. When binded, the accessory is secure from unwanted release caused by rigorous use but detachable with ease when desired providing fast on and off action. In one embodiment, ladder straps are attached to the snowboard binding, and the accessories attached to the ladder straps.

The present invention's attachable accessories can contain a plurality of items in addition to a storage container. While storage container items can include but are not limited to tools, wallets, cell phones, cameras, iPods, food, and drink, attachable accessories may include thermoses, snowshoes, proximity alert and direction indicator, GPS system for tracking possessions and personnel, emergency equipment, camera and video kits.

With regard to a camera or video kit, this application of the binding method of the present invention is new and novel as it not only enables a rider to video record himself hands-free in the direction of motion but can be rotated back towards the rider placing himself in the frame. Additionally, multiple video recording devices can be employed simultaneously on both boot bindings for multi-perspective recordings as professional snowboarders, sport instructors and laymen alike can see the immediate benefits of this real-time training tool.

Also, emergency equipment such as first aid kits, two-way radio, rescue light, emergency flag system, avalanche beacon, defibrillators and rescue shovels can also be used with this convenient binding method by emergency patrol and military personnel.

Further exemplifying the convenience and versatility of the interface binding system, attachable accessories can be mixed and matched and tailored to the user's agenda. Unlike skis where the skier's feet are pointed in a direction that is substantially forward and parallel to the direction of motion, a snowboarder's feet are pointed substantially perpendicular to the direction of motion. The present invention therefore teaches at least four logical locations for the placement of attachable accessories onto the snowboard: 1) in front of the lead foot, 2) behind the lead foot, 3) in front of the rear foot, and 4) behind the rear foot. Accordingly, for illustrative purposes only, video cameras can be attached to each and every binding interface location for a video shoot agenda; a camera, a thermos, a first-aid kit, and a container for a general purpose agenda; or just a single small container for personal items for performing tricks on a halfpipe agenda.

The present invention has two modes—a rider mode and a carry mode. The rider mode is when the user is riding with the attachable accessories mounted on the board. This enables the user to access their personal items conveniently while participating in the sport. At other times, a rider must leave their board outside the mountain resort lodge (i.e. to enter a restaurant or restroom, etc.), and must take their personal belongings with them. This is the carry mode. One advantage of these modes is the convenience provided by not making unnecessary trips to car, locker, or lodge as this detracts from the amount of time participating in the sport.

BRIEF DESCRIPTION OF THE DRAWINGS

FIG. 2 shows a perspective view of a binding receiving an attachable accessory.

FIG. 3 is a perspective view from beneath of the base of the binding.

FIGS. 4A and 4B together are an exploded view of the female and male connecting sections of an illustrative embodiment of the interface binding system of the present invention.

FIGS. 5A and 5B are sectional views taken along the lines 5-5 of FIGS. 4A and 4B.

FIG. 6 is a sectional view of the male and female sections shown in a mated position.

FIGS. 7A and 7B are sectional views taken along the lines 7-7 of FIGS. 4A and 4B.

DETAILED DESCRIPTION

Figure 1:
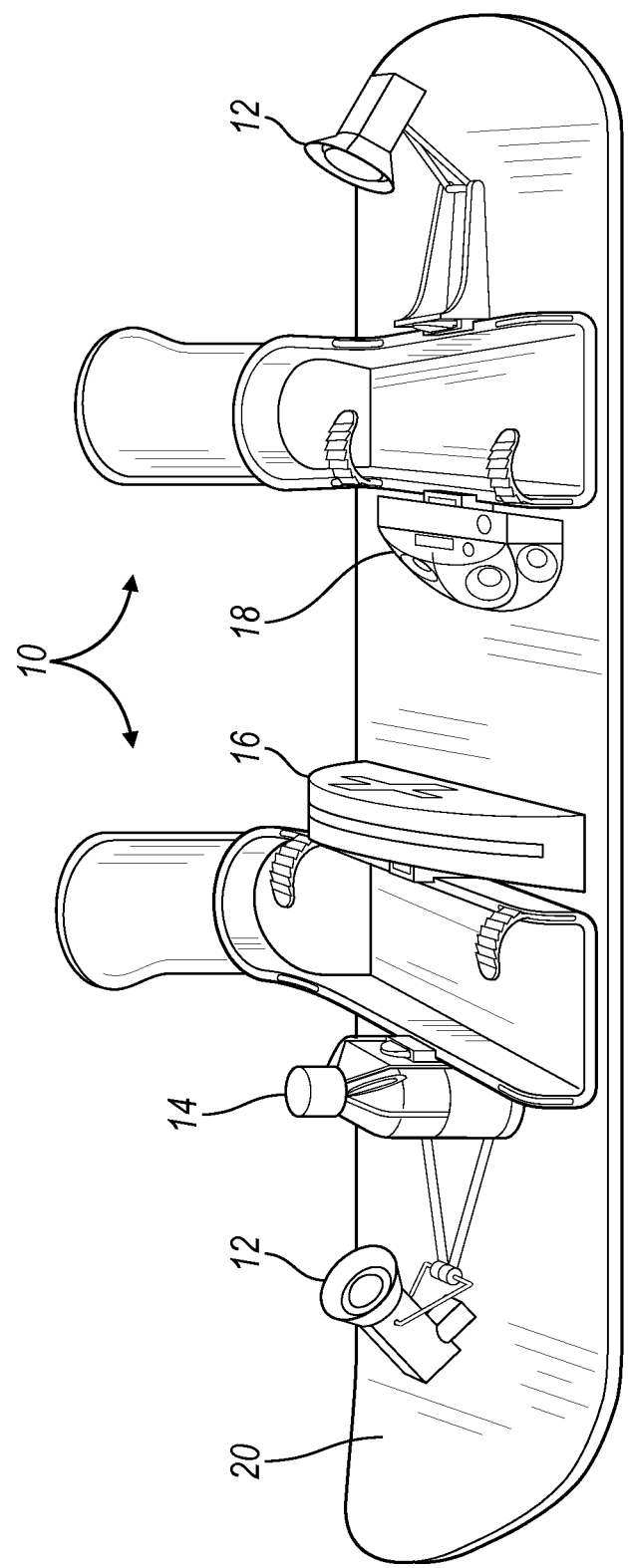
FIG. 1 shows a perspective view of the present invention with attachable accessories.

FIG. 1 shows a perspective view of snowboard bindings 10 of the present invention with attachable accessories 12, 14, 16 and 18 mounted on snowboard 20 or similar sports board. It should be understood that attachable accessories in this example include but are not limited to video kits, thermoses, storage containers, first aid kits or portable radios/audio devices.

The illustrative embodiment of FIG. 2 of a snowboard binding includes a base plate 22, sidewalls 24, toe strap slots and ankle strap slots 26, used to mount toe and ankle ladder straps 28, and attachable accessory slots 30 used to mount attachable accessory ladder straps 32. Heel cup 34 and highback 36 will not be described herein since it is well known in prior art. It should be understood that the actual snowboard binding is not shown in these illustrations. Rather, different types of snowboard bindings may be attached to the snowboard.

FIG. 3 is a perspective view from beneath of the base of the binding illustrating a possible embodiment of attachable accessory strap slots 30 receiving the attachable accessory ladder straps 32 with a restraining nipple 38. Of course, those skilled in the art will appreciate that binding straps may be attached to the sidewalls 24 without the use of slots 30, e.g. using apertures 40 formed in the snowboard binding sidewalls 24 that receive a screw or other fastener to engage with an end of the binding straps.

FIGS. 4A and 4B are exploded views of the female (buckle 42) and male (attachable accessory ladder strap 32) connecting sections of an illustrative interface binding system of the present invention.

As shown in FIG. 5, buckle 42 comprises a housing with a base, a pair of side members, and a spring actuated lever forms a passageway for releasably receiving at least one tooth of the attachable accessory ladder strap 32 in order to restrain the strap unidirectionally but is prevented from moving in a substantially opposite direction.

As the teeth of strap 32 inserted into a passageway through the bottom portion of the housing 44 and exiting through the top portion of the housing 44 engages with actuator 46 in combination with the physical contact of the base of the housing 44 as it sits atop of snowboard binding sidewall 24 creates a biasing tension force preventing unwanted movement or release.

FIG. 6 is a sectional view of the male and female sections shown in a mated position.

FIGS. 7A and 7B are a side view of the present invention. Actuator 46 may be attached to the buckle housing 44 with an actuator pinion with spring 50. Buckle 42 may be attached to mounting plate 48 by rivets or other similar securing means inserted through buckle housing apertures to the mounting plate 52. Mounting plate 48 comprising corner apertures 54 may be used to join buckle 42 to attachable accessories 12, 14, 16, and 18. FIGS. 7A and 7B further illustrate an embodiment of attachable accessory ladder strap 32 within attachable accessory strap slot 30 of the snowboard binding sidewall 24.

Having described the presently preferred exemplary embodiments of a new interface binding system via the snowboard binding in accordance with the present invention, it is of course, to be understood that modifications, variations and changes will be apparent to some only after study, and a routine undertaking to those of ordinary skill in the art having the benefit of this disclosure, being matters of routine mechanical design and fabrication.

The illustrative embodiments described herein are not necessarily intended to show all aspects or technical equivalents of the invention, but rather are used to describe a few illustrative embodiments and therefore are not intended to be construed narrowly in view of the illustrative embodiments.

In particular, while a buckle and ladder strap combination is a preferred exemplary embodiment of this invention, other fastening means can be employed to secure the attachable accessories without departing from the scope or spirit of the invention.

One such fastening means may include a beveled male section protruding from the top of the snowboard binding sidewall slidably receiving a female section secured to an attachable accessory. "Fastening means", therefore is understood to mean all methodologies for securing an attachable accessory onto the snowboard binding. For example, the disclosed embodiment is designed to interoperate with one of the most popular binding types currently on the market. However, other similar implementations are envisioned for other types of bindings.

While preferred embodiments for an interface binding system for attachable accessories have been shown, it is anticipated that some of the features and structural details of the invention may be incorporated into structural forms other than is shown. For example the female section can be reversed and integral to the binding and the male section integral to the attachable accessory.

It can be contemplated that the mating sections can be installed during the fabrication of the attachable accessory and the snowboard binding or retrofitted subsequently through a mechanical clamping mechanism such as a C-clamp with attachable accessory combination mounted onto the sidewall of the snowboard binding. It can be further contemplated that this post binding fabrication method of attachment is not limited to this particular construction.

Worth noting, the shape, size, location and fabrication materials may differ depending on the application of the attachable accessory. For example, while the sidewalls of the snowboard binding is an exemplary location to attach various accessories, this does not preclude attaching these accessories to the highback, toe and ankle strap or other location on the snowboard binding.

It can be further appreciated that some applications of the invention without limitation can be incorporated into other glideboards, kayaks, bikes, boats, motor vehicles, airplanes, tool boxes, baby strollers, wheelchairs, exercise equipment, and military, sports, hunting and rescue apparel. One example is to utilize the attachment mechanism of the present invention on different equipment such as skis, surfboards, kayaks so that an attachable/detachable accessory such as a video camera can then be easily be moved from the snowboard to such other equipment. The present invention thus achieves the objects proposed, offering many advantages over the bindings of the prior art. Specifically, a first advantage of an extremely quick means of attaching and detaching utilitarian devices, containers and accessories.

Those skilled in the art will recognize that modifications and variations can be made without departing from the spirit of the invention. Therefore, it is intended that this invention encompass all such variations and modifications as fall within the scope of the appended claims.

What is claimed is:

1. An interface binding system for securing an attachable accessory onto a snowboard or similar sports board via a binding comprising a first attachment system having:
   a first boot binding for binding a first boot comprising:
      a baseplate with a toe end and a heel end for placement of the first boot,
      a first and second side wall where engagement members secure the first boot onto the baseplate, and
      a highback secured to the heel end of the baseplate to support a rider's leg;
   a first attachment portion attached to the binding, wherein the first attachment portion comprises a serrated ladder strap attached to the one of the first and second sidewall; and
   a second attachment portion that is configured to removably engage the first attachment portion and is fixably attached to a first attachable accessory, wherein the second attachment portion comprises a buckle system that engages the ladder strap.

2. The interface binding system of claim 1 wherein:
   the first and second sidewalls each have a vertical channel in the sidewall; and
   the ladder strap is attached to the binding by inserting the ladder strap through the vertical channel in the sidewall to which the ladder strap is attached.

3. The interface binding system of claim 2 further comprising:
   a second attachment system functionally equivalent to the first attachment system and having a ladder strap inserted through the vertical channel and hole in the sidewall of a second of the first and second sidewalls.

4. The interface binding system of claim 1 wherein
   the buckle system comprises:
   a housing with a base;
   a spring-biased actuator; and
   a pair of side members for slidably receiving the serrated ladder strap;
      wherein the buckle system is configured to allow the serrated ladder strap to be inserted into a passageway through the bottom portion of the housing exiting through a top portion of the housing.

5. The interface binding system of claim 4 wherein the buckle's spring-biased actuator engages at least one tooth of the serrated ladder strap in order to restrain the serrated ladder strap unidirectionally but is prevented from moving in a substantially opposite direction.

6. The interface binding system of claim 5 wherein the mated ladder strap and buckle actuator combination create a tension force as the bottom of the buckle body housing seats itself by making physical contact with the top of the binding sidewall preventing unwanted movement or release.

7. The interface binding system of claim 4 wherein the buckle system housing is attached to a mounting plate.

8. The interface binding system of claim 7 wherein the mounting plate is a receiver for securing the buckle system to attachable accessories.

9. The interface binding system of claim 1 wherein:
   the binding has a second boot binding for binding a second boot functionally equivalent to the first boot binding;
   the interface binding system has a second attachment system having a first attachment portion attached to the second boot binding and a second attachment portion fixably attached to a second attachable accessory.

10. The interface binding system of claim 9 providing a plurality of attachment systems, wherein:
   the first attachment portion for each of the plurality of attachment systems comprises a serrated ladder strap attached to the one of the first and second sidewalls;
   each of the first and second sidewalls of the first and second boot bindings has a vertical channel in the sidewall through which the serrated ladder strap of one of the plurality of attachment systems can be inserted to attach it to the sidewall; and
   the second attachment portion of each of the plurality of attachment systems comprises a buckle system that engages the ladder strap of that attachment system.

11. The interface binding system of claim 1, further comprising a snowboard.

12. The interface binding system of claim 1 wherein the first attachable accessory is a one of a set consisting of: a video kit, a thermos, a storage container, a first-aid kit, and a portable radio/audio device.

* * * * *